United States Patent [19]

Nagano et al.

[11] Patent Number: 6,037,423
[45] Date of Patent: Mar. 14, 2000

[54] POLYESTER ELASTOMER COMPOSITION

[75] Inventors: Hirota Nagano; Toshio Hiramatsu; Hitoshi Ueno; Tsunehiro Ohshima, all of Ohtsu, Japan

[73] Assignee: Toyo Boseki Kabushiki Kaisha, Osaka, Japan

[21] Appl. No.: 09/392,810

[22] Filed: Sep. 9, 1999

[30] Foreign Application Priority Data

| Sep. 9, 1998 | [JP] | Japan | ................................. 10-255156 |
| Sep. 9, 1998 | [JP] | Japan | ................................. 10-255157 |
| Jul. 13, 1999 | [JP] | Japan | ................................. 11-199278 |

[51] Int. Cl.$^7$ ..................................................... C08F 20/00
[52] U.S. Cl. .......................... 525/438; 525/437; 525/439; 525/450; 524/86
[58] Field of Search ..................................... 525/437, 438, 525/439, 450; 524/86

[56] References Cited

U.S. PATENT DOCUMENTS

| 5,574,090 | 11/1996 | Gray et al. | ................................. 524/560 |
| 5,783,626 | 7/1998 | Taylor et al. | ............................. 524/555 |
| 5,827,928 | 10/1998 | Morimoto et al. | ....................... 525/217 |

*Primary Examiner*—Samuel A. Acquah
*Attorney, Agent, or Firm*—Morrison & Foerster LLP

[57] ABSTRACT

A polyester elastomer composition comprising a polyester block copolymer and a compound having, in one molecule, not less than two functional groups capable of reacting with a terminal group of the polyester block copolymer, and showing (A) a weight loss (volatility) at 150° C., 2 hours of not more than 0.4% and (B) a gelation degree (gel fraction) at 250° C., 4 hours of not more than 50%; and a polyester elastomer composition comprising a polyester block copolymer, a compound having, in one molecule, not less than two functional groups capable of reacting with a terminal group of the polyester block copolymer and a chain extender heating loss percentage satisfying the formula: $(W1-W2)/W1 \leq 0.1$, and a stabilizer comprising a tertiary amine as a part of its skeleton. From such composition, an elastomer molded product having fine mechanical strength, heat resistance and resistance to hydrolysis, which shows less volatility during heating and less gel and bleed out, can be obtained.

9 Claims, No Drawings

POLYESTER ELASTOMER COMPOSITION

TECHNICAL FIELD OF THE INVENTION

The present invention relates to a polyester elastomer composition having superior mechanical property and superior durability, which is associated with less volatility during heating, less bleed-out matters or gel from the molded product.

BACKGROUND OF THE INVENTION

As a production method of polymer obtained by reacting an aromatic polyester and a lactone, a method comprising reacting a crystalline aromatic polyester and a lactone (JP-B-48-4116), a method comprising reacting a crystalline aromatic polyester and a lactone and reacting the obtained initial block copolymer and a polyfunctional acylating agent to allow extension of its chain (JP-B-48-4115), a method comprising polymerizing a lactone in a solid state in the presence of a crystalline aromatic polyester (JP-B-52-49037) and the like are known.

The polymers obtained by these methods are thermoplastic and have superior rubber like elasticity. However, they have insufficient heat resistance and when exposed to high temperature for a long time, the strength and elongation reduce strikingly. In addition, these polymers have insufficient water resistance and are susceptible to hydrolysis in the presence of water. For these reasons, it is difficult to put the compositions containing these polymers as they are to practice as a material for a fiber, a film, a formed product and the like.

For an improved heat resistance and an improved water resistance of the polyester block copolymer as mentioned above, a method comprising the use of an epoxy compound having one or more functional groups (JP-A-58-162654) and the like have been proposed. This method improves heat resistance and water resistance.

In addition, a method comprising adding an epoxy compound for an improved mechanical property of a polyester block copolymer obtained by copolymerization of a crystalline aromatic polyester and polyalkylene glycols such as polytetramethylene glycol may be employed.

This method, nevertheless, has problems in that a great amount of unreacted certain epoxy compounds is evaporated when the obtained compositions containing epoxy compounds are heated. When the composition is processed into a molded product and subjected to other processing steps such as coloring of resin, imparting inflammability and the like, there is a possibility that hygiene problem may occur. Moreover, generated gases may corrode cylinder and screw of an extruder, a forming machine and the like, as well as the surface of a mold, and in the field of electric equipment parts and electronic equipment parts, generated gases may corrode metallic parts, thereby causing contact failure and defective conduction. To solve these problems, the kind of epoxy compound is limited to suppress volatility during heating (JP-A-10-30053).

The addition of the aforementioned epoxy compound leads to improved heat resistance and hydrolysis of resin, and less volatility during heating, but to deal with a situation involving exposure to a harsh use environment, a stabilizer such as an antioxidant, a photostabilizer and the like is generally added. When, however, an inappropriate stabilizer is added in an inappropriate amount, the properties cannot be improved, and many problems occur such as bleeding out due to insufficient affinity for resin to impair appearance of a molded product, degraded durability and the like. In addition, an adverse influence that degrades mechanical properties and the like could be exerted. Moreover, a gel occurs during mixing of a polyester block copolymer, an epoxy compound and a stabilizer in an extruder, which in turn causes problems of clogging of a filter, impaired appearance of a molded product and the like, thereby necessitating a special stabilizer.

An object of the present invention is to provide a thermoplastic polyester elastomer composition having superior heat resistance and superior resistance to hydrolysis, which is associated with less volatility during heating, less gel or bleed-out matters.

SUMMARY OF THE INVENTION

Such object can be achieved by the following polyester elastomer composition of the present invention.

Accordingly, the present invention provides the following.

(1) A polyester elastomer composition comprising a polyester block copolymer and a compound having, in one molecule, not less than two functional groups capable of reacting with a terminal group of the polyester block copolymer, and showing (A) a weight loss (volatility) at 150° C., 2 hours of not more than 0.4% and (B) gelation degree (gel fraction) at 250° C., 4 hours of not more than 50%.

(2) A polyester elastomer composition comprising a polyester block copolymer, a compound having, in one molecule, not less than two functional groups capable of reacting with a terminal group of the polyester block copolymer and a chain extender heating loss percentage satisfying the following formula (I), and a stabilizer comprising a tertiary amine as a part of its skeleton $$(W1-W2)/W1 \leq 0.1 \tag{I}$$

wherein W1 is the weight of the compound before heat treatment and W2 is the weight of the compound after heat treatment at 200° C. for 30 minutes.

(3) The polyester elastomer composition of (2) above, wherein the compound having not less than two functional groups and satisfying the formula (I) is contained in a proportion of 0.1–10 parts by weight per 100 parts by weight of the polyester block copolymer and the stabilizer is contained in a proportion of 0.1–5 parts by weight per 100 parts by weight of the polyester block copolymer.

(4) The polyester elastomer composition of (2) above, wherein the stabilizer is a compound having a molecular weight of not less than 2000.

(5) The polyester elastomer composition of (2) above, wherein the tertiary amine which is a part of the stabilizer is hindered amine.

(6) The polyester elastomer composition of (1) above, wherein the polyester block copolymer is obtained by reacting a crystalline aromatic polyester and a lactone.

(7) The polyester elastomer composition of (2) above, wherein the polyester block copolymer is obtained by reacting a crystalline aromatic polyester and a lactone.

(8) The polyester elastomer composition of (1) above, wherein the compound having not less than two functional groups is at least one member selected from the group consisting of bisphenol F-diglycidyl ether, bisphenol A-diglycidyl ether and bisphenol S-diglycidyl ether.

(9) The polyester elastomer composition of (2) above, wherein the compound having not less than two functional groups and satisfying the formula (I) is at least one member selected from the group consisting of bisphenol F-diglycidyl ether, bisphenol A-diglycidyl ether and bisphenol S-diglycidyl ether.

DETAILED DESCRIPTION OF THE INVENTION

As used herein, the polyester block copolymer of the present invention is a copolymer comprising a high melting point hard polyester segment and a low melting point polymer segment having a molecular weight (Mw) of about 400 to 6000, which is a thermoplastic polyester block copolymer called a polyester elastomer comprising a hard polyester segment having a melting point of not less than 150° C. as a constituent component, and a low melting point polymer segment having a melting point or a softening point of not more than 80° C. as a constituent component.

With regard to the polyester block copolymer, the high melting point hard polyester segment is exemplified by a polyester obtained from an aromatic dicarboxylic acid such as terephthalic acid, isophthalic acid, 1,5-naphthalenedicarboxylic acid, 2,6-naphthalenedicarboxylic acid, 4,4'-diphenyldicarboxylic acid, bis(4-carboxyphenyl) methane, bis(4-carboxyphenyl)sulfone and the like, or its ester, and a diol such as ethylene glycol, propylene glycol, tetramethylene glycol, pentamethylene gylcol, 2,2-dimethyltrimethylene glycol, hexamethylene glycol, decamethylene glycol, p-xylylene glycol, cyclohexane dimethanol, copolyester using two or more kinds of the dicarboxylic acids, or two or more kinds of the diols and the like; a polyester derived from an oxy acid such as p-(β-hydroxyethoxy)benzoic acid and esters thereof; a crystalline aromatic polyester such as polyetherester produced from an aromatic ether dicarboxylic acid such as 1,2-bis(4,4'-dicarboxyphenoxy)ethane and the diol as mentioned above; polylactone such as polypivalolactone; and copolyesters obtained by a combination of the aforementioned dicarboxylic acids, oxy acids, diols and the like.

Examples of the constituent component of the low melting point polymer segment having a molecular weight of 400–6000 include poly(alkylene-ether)glycol such as poly(ethyleneoxide)glycol, poly(propyleneoxide)glycol, poly(tetramethyleneoxide)glycol, a mixture thereof and the like, and a polyether glycol copolymer containing the polyether glycol. In addition, a polyester produced from aliphatic dicarboxylic acid having 2 to 12 carbon atoms and aliphatic glycol having 2 to 10 carbon atoms, such as polyethylene adipate, polytetramethylene adipate, polyethylene sebacate, polyneopentyl sebacate, polytetramethylene dodecanate, polytetramethylene azelate, polyhexamethylene azelate, polylactones (e.g., poly-ε-caprolactone) and the like are exemplified. Examples thereof further include a polyester polyether block copolymer which is a combination of the aforementioned polyester and polyether, and the like. The proportion of the low melting point polymer segment in the above-mentioned polyester polyether block copolymer is preferably 5–80% by weight.

Of these, those obtained by reacting a crystalline aromatic polyester and lactones are associated with the problem in that the molecular weight should be increased by reaction with a compound having a functional group capable of reacting with a terminal of the polyester, thereby to achieve high functions as an elastomer, which in turn increases the amount to be used of the compound having the functional group capable of reacting with a terminal group of the polyester. It is preferable, therefore, to apply the present invention to such copolymers.

The crystalline aromatic polyester used here is preferably a polymer mainly comprising an ester bond or an ester bond and an ether bond, wherein at least one aromatic group is the main repeat unit and a molecular end has a hydroxyl group. This crystalline aromatic polyester preferably has a melting point of not less than 150° C. The molecular weight varies depending on use. When it is used as a material for forming, it has a molecular weight of not less than 5000, more preferably not less than 8000, and when it is used as an adhesive or coating agent, it has a molecular weight of not more than 5000.

Preferable examples of crystalline aromatic polyester include homopolyesters such as polyethylene terephthalate, polytetramethylene terephthalate, poly-1,4-cyclohexylenedimethylene terephthalate, polyethylene-2,6-naphthalate, polybutylene-2,6-naphthalate and the like; polyester ethers such as polyethylene oxybenzoate, poly-p-phenylenebisoxyethoxyterephthalate and the like; polyester copolymer and polyester ether copolymer mainly containing a tetramethylene terephthalate units or ethylene terephthalate units and other copolymerizable component such as tetramethylene or ethylene isophthalate units, tetramethylene or ethylene adipate units, tetramethylene or ethylene sebacate units, 1,4-cyclohexylenedimethylene terephthalate units, tetramethylene or ethylene p-oxybenzoate units and the like; and the like. When it is a copolymer, tetramethylene terephthalate or ethylene terephthalate units are preferably contained in a proportion of not less than 60 mol %.

As the lactones, caprolactone is most preferably used. Besides, enanelactone, caprylolactone and the like can be used, wherein two or more of these lactones can be used concurrently.

The proportion of the above-mentioned crystalline aromatic polyester and lactone may vary depending on the use thereof. In general terms, when crystalline aromatic polyester is contained in a greater proportion, the resulting composition becomes hard, showing improved mechanical properties such as strength, elongation and the like. When the proportion of lactone increases, the resulting composition becomes soft, thus improving properties at low temperatures. Therefore, the proportion of the two is detremined in consideration of the balance of the mechanical strength, low temperature property and the like according to use. A typical mixing weight ratio is aromatic polyester/lactone of 97/3–5/95, more generally 95/5–30/70. When a hard formed article is desired, the above-mentioned ratio is preferably 95/5–70/30.

The compound to be used in the present invention, which has at least two functional groups capable of reacting with the terminal group of the above-mentioned polyester block copolymer can have any structure. A compound having a chain extender heating loss percentage satisfying the following formula (I) and having, in one molecule, not less than two above-mentioned functional groups is preferable:

$$(W1-W2)/W1 \leq 0.1 \tag{I}$$

wherein W1 is the weight of the compound before heat treatment and W2 is the weight of the compound after heat treatment at 200° C. for 30 minutes.

The chain extender heating loss percentage can be obtained as follows.

The compound stored in a desiccator containing silica gel at 25° C. for one week is placed by about 5 g in a known glass weighing bottle (W'g) (diameter 6 cm×height 3 cm) and precisely weighed (W0') including a weighing bottle. Then, the lid is opened and the bottle in this state is left standing in a hot air dryer at 200° C. for 30 minutes. After cooing, it is precisely weighed (W1') including the weighing bottle and heating loss percentage is calculated according to the following formulas:

specimen weight before heat treatment ($W1=W0'-W$)

specimen weight after heat treatment ($W2=W1'-W$)

chain extender heating loss percentage=$(W0'-W1')/(W0'-W)$

Specific examples include bisphenol A-diglycidyl ether, bisphenol F-diglycidyl ether, bisphenol S-diglycidyl ether, cresol novolac glycidyl ether, phenol novolac glycidyl ether, polycarbodiimide, bisoxazoline compound and the like. Particularly preferable examples include bisphenol A-diglycidyl ether, bisphenol F-diglycidyl ether, bisphenol S-diglycidyl ether and the like.

The proportion of these compounds having at least two functional groups varies depending on the number of the functional groups present at the terminal of the polyester block copolymer to be used, or the desired property of the composition to be ultimately obtained. Preferably, it is 0.1 part by weight–10 parts by weight, more preferably 0.3 part by weight–8 parts by weight, per 100 parts by weight of the above-mentioned polyester block copolymer.

When it is less than 0.1 part by weight, the action and effect achieved by the reaction of these compounds, such as improved formability attributable to thickening and improvement in heat resistance and resistance to hydrolysis, cannot be significantly exerted. When it exceeds 10 parts by weight, unreacted compound remains, exerting adverse influence on the quality of the molded product, such as rough surface of the product and the like.

In the composition of the present invention, the reaction of the aforementioned polyester block copolymer and the compound having, in one molecule, not less than two functional groups capable of reacting with a terminal group of the polyester can occur without using a catalyst. In view of acceleration of the reaction and affinity, the use of a catalyst is desirable. The catalyst is exemplified by amines, phosphorus compounds, Ia group or IIa group metal (selected from periodic table) salts of monocarboxylic acid and/or dicarboxylic acid having 10 or more carbon atoms and the like. Of these, trivalent phosphorus compounds such as tributylphosphine, triphenylphosphine and the like; metal salts of stearic acid such as calcium stearate, sodium stearate and the like are preferable. These catalysts may be used alone or in combination. The above-mentioned catalysts afford similar effects irrespective of the mode of addition and the amount thereof to added is generally not more than 3 parts by weight, preferably 0.03–2 parts by weight, per 100 parts by weight of the above-mentioned polyester block copolymer.

The polyester elastomer composition of the present invention preferably shows a weight loss at 150° C., 2 hours of not more than 0.4%, particularly preferably not more than 0.35%, more preferably not more than 0.3%, still more preferably not more than 0.25%, most preferably not more than 0.2%. When the weight loss exceeds 0.4%, the amount of volatile matter increases when a polyester elastomer composition is processed into a molded product and other processing such as coloring of resin, imparting inflammability and the like, thereby posing various problems.

The polyester elastomer composition of the present invention preferably shows a gelation degree at 250° C., 4 hours of not more than 50%. It is particularly preferably not more than 30%, more preferably not more than 20%, still more preferably not more than 10%, most preferably not more than 5%. When gelation degree exceeds 50%, a gel-like matter occurs when a polyester elastomer composition is processed into a molded product and other processing such as coloring of resin, imparting inflammability and the like, thereby posing problems in terms of appearance caused by contamination of a molded product with the gel-like matter, decrease in strength, increase in pressure of forming machine and kneader due to clogging of filter set on a delivery end of the forming machine and kneader, and the like.

The measurement methods of the above-mentioned items are disclosed with regard to Examples.

The polyester elastomer composition of the present invention can contain various heat stabilizers and photostabilizers. The structure of the stabilizer is not particularly limited. For a polyester elastomer composition to show a gelation degree at 250° C., 4 hours of not more than 50%, the stabilizer preferably does not contain the primary or secondary amine moiety. In addition, a part of the skeleton of the stabilizer is preferably tertiary amine. In consideration of efficiency of stabilizing the polyester block copolymer, the tertiary amine moiety is a cyclo ring, particularly, a cyclo ring having a hindered amine, benzophenone or benzotriazole structure is preferable.

The use of a stabilizer having an amine less than tertiary, namely, a primary or secondary amine, results in gel in the polyester elastomer composition, giving rise to problems such as clogging of a filter of an extruder, impairment of the appearance of a molded product and the like. It is postulated that this is due to the primary or secondary amine taken into an epoxy resin, which provides crosslinking of epoxy resin molecules, as is evidenced by the fact of primary or secondary amine being a curing agent of epoxy resins.

When the above-mentioned stabilizer has a molecular weight (Mw) of not less than 2000, the stabilizer does not bleed out from a molded product after forming and does not cause problems of poor appearance, attenuation of durability and the like. Such high molecular weight stabilizer preferably has a tertiary amine moiety that is a cyclo ring, particularly a hindered amine, benzophenone or benzotriazole structure.

The amount to be added of the above-mentioned stabilize varies depending on the use of the elastomer composition. In general, a use requesting higher stability requires high amount of addition. However, too high an amount to be added allows precipitation of the stabilizer, staining of a mold for forming, and accumulation thereof in the polymer channel, which are inconvenient for forming. The stabilizer may precipitate onto the surface of a finished molded product during use, may degrade the appearance or may cause hygiene problems. Therefore, the amount of addition is suitably in the range of 0.1–5 parts by weight, more preferably 0.3–3 parts by weight, per 100 parts by weight of the polyester block copolymer.

The above-mentioned stabilizer is used alone or in combination with other typical stabilizers. The stabilizers to be concurrently used may be, for example, phenolic stabilizer, amine stabilizer, phosphorus stabilizer, thioether stabilizer, metal salt stabilizer, and the like. In the present invention, a particularly high molecular weight compound with less volatility is preferably used as the stabilizer, so that volatility, mechanical property, heat resistance and resistance to hydrolysis can be balanced.

The thermoplastic polyester elastomer composition of the present invention may contain a fiber-like enforcing material and/or an inorganic filler, where necessary. It is added in a proportion not exceeding 100 parts by weight per 100 parts by weight of the aforementioned polyester block copolymer. As a result, strength, rigidity, heat resistance, dimensional stability and the like can be enhanced. As the fiber-like enforcing material, inorganic fibers such as glass fiber, silica glass fiber, alumina fiber, plaster fiber, ceramic fiber, asbestos fiber and the like, whiskers such as potassium titanate whisker, zinc oxide whisker and the like, carbon fiber and the like are exemplified. As the inorganic filler, talc, WOL-LAST NITE, kaolin, mica, sericite, clay, alumina silicate, glass beads, milled glass fiber, calcium carbonate, silica and the like are exemplified.

The polyester elastomer composition of the present invention can further contain an inflammable agent where necessary. It is added in a proportion not exceeding 100 parts by weight per 100 parts by weight of the aforementioned polyester block copolymer, whereby inflammability can be enhanced. Examples of the inflammable agent include organic additives of halogen type, phosphorus type, melamine type and the like, inorganic additives such as metal hydroxide and the like, and the like. Where necessary, an inflammable auxiliary such as antimony oxide, boron compound and the like can be added.

The composition of the present invention can contain crystallization accelerator, crystal nucleator, antioxidant, ultraviolet absorber, plasticizer, lubricant, antistatic, conductivity improver, improver of resistance to hydrolysis, polyfunctional crosslinking agent, shock resistance improver, metal degradation preventive, coloring agent and the like conventionally known according to the use, object and the like. As long as the object of the present invention is not impaired, other resins such as polyester other than the polyester block copolymer, polyamide, polyolefin, polyurethane and the like can be blended.

The composition of the present invention can be produced by any method which is free of particular limitation. For example, the objective composition can be obtained by heating and kneading in an extruder, roll mill, Banbury mixer and the like.

The constitution, action and effect of the present invention are explained in detail in the following by Examples, to which the present invention is not limited in any way. It is possible to modify and practice the invention without deviating from the gist of the present invention, all of which modes are encompassed in the technical scope of the present invention.

In the present invention, "part" and "%" mean "parts by weight" and "% by weight" unless particularly specified.

PRODUCTION EXAMPLE 1

Preparation of Polyester Block Copolymer

Polytetramethylene terephthalate (70 kg) and ε-caprolactone (30 kg) were placed in a reaction vessel, purged with nitrogen gas, and melt-reacted for 2 hours while stirring at 230° C. to give chips of polyester block copolymer. The obtained polyester block copolymer had a reduced specific viscosity of 1.163, acid value of 65 equivalents/$10^6$ g, tensile strength at break of 370 kg/cm$^2$, and tensile elongation at break of 710%.

PRODUCTION EXAMPLE 2

Preparation of Polyester Block Copolymer

Dimethyl terephthalate (40 kg), 1,4-butanediol (25 kg) and tetrabutyl titanate (75 g) were placed in a reaction vessel, purged with nitrogen gas, and subjected to ester interchange by a conventional method. When the ester interchange percentage reached not less than 95%, polytetramethylene glycol (32 kg) having a molecular weight of 1,000 was added and mixed. The mixture was transferred to an autoclave and condensation polymerization was carried out at 250° C. for 140 minutes to give chips of polyester block copolymer. The obtained polyester block copolymer had a reduced specific viscosity of 1.211, acid value of 34 equivalents/$10^6$ kg, tensile strength at break of 310 kg/cm$^2$, and tensile elongation at break of 550%.

reduced specific viscosity

A polymer (0.05 g) was dissolved in a mixed solvent (25 ml) of phenol/tetrachloroethane=60/40 and measured at 30° C. using an Ostwald's viscometer.

Acid value

The acid value was measured by dissolving 0.5 g of a polymer in benzyl alcohol/chloroform (100 ml, 50/50 by weight) and titrating with a solution of KOH in ethanol. The indicator was phenol red.

Example 1

The chips of polyester block copolymer (100 parts) obtained in Production Example 1, bisphenol F-diglycidyl ether (4 parts) as a compound having not less than 2 functional groups, and 1-[2-{3-(3,5-di-t-butyl-4-hydroxyphenyl)-propionyloxy}ethyl]-4-{3-(3,5-di-t-butyl-4-hydroxyphenyl)propionyloxy}-2,2,6,6-tetramethylpiperidine (1 part by weight, SANOL® LS2626 manufactured by Sankyo Company, Limited), as a stabilizer having a tertiary amine skeleton were placed in a drum tumbler, and stirred at room temperature for 30 minutes. The mixture was extruded from a 40 mmφ twin-screw extruder (same direction) at 230° C. and cooled with water and chipped. The obtained chips were dried under reduced pressure at 100° C. to give chips of the polyester elastomer composition of the present invention.

Example 2

In the same manner as in Example 1 except that the proportion of the stabilizer having a tertiary amine skeleton was set to 1.5 parts by weight, chips of the polyester elastomer composition of the present invention were obtained.

Example 3

In the same manner as in Example 1 except that a hindered phenol durability improver (0.3 part) generally known was added together with the stabilizer having a tertiary amine skeleton, chips of the polyester elastomer composition of the present invention were obtained.

Comparative Example 1

In the same manner as in Example 1 except that CHI-MASSORB 944FL manufactured by CIBA Specialty Chemicals Inc. (0.8 part) was used as a stabilizer having a primary and secondary amine skeletons instead of the stabilizer having a tertiary amine skeleton, chips of the polyester elastomer composition were obtained.

Comparative Example 2

In the same manner as in Example 1 except that polyethylene glycol diglycidyl ether (3 parts) was used instead of bisphenol F-diglycidyl ether, chips of the polyester elastomer composition were obtained.

tensile strength at break, tensile elongation at break

Using an injection molding machine (SANJO SEIKI CO., LTD., model-SAV), the chips were formed into a flat board (100 mm×100 mm×2 mm), and a dumb-bell No. 3 test specimen was punched out from the flat board. Using TENSILON UTM-III manufactured by TOYO MEASURING INSTRUMENTS CO., LTD., the obtained test specimen was stretched at a rate of 500 mm/min. The load (kg) when the specimen broke was divided by initial sectional area (cm$^2$) and taken as the tensile strength at break (kg/cm$^2$), and the ratio of the elongation of the specimen until the specimen broke to the original specimen length was taken as the tensile elongation at break (%). The values were the average of 5 specimens.

melt viscosity

According to the test method described in JIS K6760, the melt flow rate (MFR) at 230° C. was measured.

heat resistance

A dumb-bell test specimen was left standing in a hot air dryer at 180° C. and the tensile elongation at break of the specimen after standing was measured. The time period until the tensile elongation at break reaches 50% of the initial tensile elongation at break was taken as the index of heat resistance.

resistance to hydrolysis

A dumb-bell test specimen was immersed in boiling water, and the tensile elongation at break after standing the specimen was measured. The time period until the tensile elongation at break reaches 50% of the initial tensile elongation at break was taken as the index of resistance to hydrolysis.

measurement of gel fraction

A polyester elastomer composition (about 50 g, V0) was precisely weighed and placed in an about 250 ml glass bottle (about 4 cmø×height 20 cm), which was followed by heat treatment comprising immersing into a silicon oil bath at 250° C. and stirring while blowing in nitrogen (about 30 ml/min) from the upper part for 4 hours. After the treatment, the content was dissolved in a mixed solvent (500 ml) of tetrachloroethane and phenol (1/1 weight ratio) and the glass bottle was also washed with a part of the above-mentioned mixed solvent. Insoluble matter was separated by a 100 mesh stainless wire net having a known weight (weight V') and dried at 150° C., not more than 10 torr, for 8 hours. The insoluble matter was weighed with the wire net (V1) and gel fraction was determined from the following formula. A specimen having lower gel fraction is superior specimen associated with less gelation.

gel fraction (%)=(V1−V')×100/V0 volatility (heating loss percentage)

Pellets (about 20 g) adjusted to have a water content of not more than 0.03% were taken in a glass weighing bottle (S'g) (diameter 6 cm×height 3 cm) having a known weight and weighed precisely with the weighing bottle (S0). The bottle was left standing in a hot air dryer at 150° C. for 2 hours with the lid open. After cooling, the bottle was weighed with the weighing bottle (S1) and the heating loss percentage was calculated by the following formula. Pellets having a lower heating loss percentage is superior in volatility.

heating loss percentage (%)=(S0−S1)×100/(S0−S')

When the water content of the pellets exceeds 0.03%, they were dried to the water content of not more than 0.03% at 100° C., not more than 10 torr.

chain extender heating loss percentage

A chain extender (a compound having not less than 2 functional groups, about 5 g) stored and dried in a desiccator containing silica gel at 25° C. for one week was taken in a glass weighing bottle (W'g) (diameter 6 cm×height 3 cm) having a known weight and weighed precisely with the weighing bottle (W0'). The bottle was left standing in a hot air dryer at 200° C. for 30 minutes with the lid open. After cooling, the bottle was weighed with the weighing bottle (W1') and the heating loss percentage was calculated by the following formulas.

Test sample weight before heating (W0'−W')

Test sample weight after heating (W1'−W')

chain extender heating loss percentage=(W0'−W1')/(W0'−W')

measurement of bleed out (gloss)

A flat board was left standing in a thermostat bath at 40° C. for 1000 hours and subjected to the measurement with gloss meter IG-320 manufactured by HORIBA. A flat board having a greater gloss suffers less from bleed out and is a superior sample.

Polyester elastomer compositions obtained in Examples and Comparative Example were evaluated for the above-mentioned evaluation items, the results of which are shown in Table 1.

TABLE 1

| Components and evaluation items | Ex. 1 | Ex. 2 | Ex. 3 | Com.Ex. 1 | Com.Ex.2 |
|---|---|---|---|---|---|
| polyester block copolymer | 100 | 100 | 100 | 100 | 100 |
| Stabilizer A | 1.0 | 1.5 | 1.5 | — | 1.0 |
| Stabilizer B | — | — | — | 0.8 | — |
| Hindered phenol stabilizer | — | — | 0.3 | — | — |
| bisphenol F-diglycidyl ether (chain extender heating loss percentage = 0.05) | 3.5 | 4.5 | 4.0 | 4.0 | — |
| polyethyleneglycol diglycidyl ether (chain extender heating loss percentage = 0.22) | — | — | — | — | 3.0 |
| tensile strength at break (kg/cm$^2$) | 380 | 390 | 380 | 350 | 395 |
| tensile elongation at break (%) | 600 | 650 | 630 | 670 | 590 |
| MFR (g/10 min) | 16 | 12 | 15 | 16 | 12 |
| gel fraction (%) | 1 | 1 | 2 | 60 | 1 |
| heating loss percentage (%) | 0.12 | 0.12 | 0.15 | 0.20 | 0.48 |
| heat resistance (elongation half-life period, days) | 20 | 25 | 24 | 17 | 19 |
| resistance to hydrolysis (elongation half-life period, days) | 7 | 7 | 8 | 5 | 7 |

Stabilizer A: 1-[2-{3-(3,5-di-t-butyl-4-hydroxyphenyl)propionyloxy}ethyl]-4-{3-(3,5-di-t-butyl-4-hydroxyphenyl)propionyloxy}-2,2,6,6-tetramethylpiperidine
Stabilizer B: poly[{6-(1,1,3,3-tetramethylbutyl)amino-1,3,5-triazine-2,4-diyl}{(2,2,6,6-tetramethyl-4-piperidylimino}-hexamethylene{(2,2,6,6-tetramethylpiperidyl)imino})

Example 4

The polyester block copolymer chips (100 parts) obtained in Production Example 1, bisphenol F-diglycidyl ether (3.5 parts) as a compound having not less than 2 functional groups, and SANOL® LS2626 (1 part) as a stabilizer having a tertiary amine skeleton were placed in a drum tumbler, and stirred at room temperature for 30 minutes. The mixture was extruded from a 40 mmφ two-screw extruder (same direction) at 230° C. and cooled with water and chipped. The obtained chips were dried under reduced pressure at 100° C. to give chips of the polyester elastomer composition of the present invention.

Example 5

In the same manner as in Example 4 and according to the amounts recited in Table 2, the chips of the polyester elastomer composition of the present invention were obtained. The amounts of Stabilizer A and bisphenol F-diglycidyl ether were changed.

Example 6

In the same manner as in Example 4 and according to the amounts recited in Table 2, the chips of the polyester elastomer composition of the present invention were obtained. The amounts of Stabilizer A and bisphenol F-diglycidyl ether were changed. A typical hindered phenol stabilizer was added.

Polyester elastomer compositions obtained in Examples were evaluated for the above-mentioned evaluation items, the results of which are shown in Table 2.

TABLE 2

| Components and evaluation items | Example 4 | Example 5 | Example 6 |
|---|---|---|---|
| polyester block copolymer | 100 | 100 | 100 |
| Stabilizer A | 1.0 | 1.5 | 1.0 |
| Hindered phenol stabilizer | — | — | 0.3 |
| bisphenol F-diglycidyl ether (chain extender heating loss percentage = 0.05) | 4.0 | 4.0 | 4.0 |
| tensile strength at break (kg/cm$^2$) | 395 | 390 | 380 |
| tensile elongation at break (%) | 610 | 620 | 630 |
| MFR (g/10 min) | 14 | 15 | 15 |
| gel fraction (%) | 1 | 1 | 2 |
| heating loss percentage (%) | 0.12 | 0.13 | 0.15 |
| heat resistance (elongation half-life period, days) | 20 | 24 | 23 |
| resistance to hydrolysis (elongation half-life period, days) | 7 | 7 | 8 |

Example 7

The polyester block copolymer chips (100 parts) obtained in Production Example 1, bisphenol F-diglycidyl ether (4 parts) as a compound having not less than 2 functional groups, and dimethyl succinate—1-(2-hydroxyethyl)-4-hydroxy-2,2,6,6-tetramethylpiperidine condensation polymerization product (Mw: 3800, 1 part) as a stabilizer having a molecular weight of not less than 2000 were placed in a drum tumbler, and stirred at room temperature for 30 minutes. The mixture was extruded from a 40 mmϕ two-screw extruder (same direction) at 230° C. and cooled with water and chipped. The obtained chips were dried under reduced pressure at 100° C. to give chips of the polyester elastomer composition of the present invention.

Example 8

In the same manner as in Example 8 except that the amount of the stabilizer having a molecular weight of not less than 2000 was set to 1.5 parts by weight, the chips of the polyester elastomer composition of the present invention were obtained.

Example 9

In the same manner as in Example 8 except that a hindered phenol durability improver (0.3 part) generally known was added together with the stabilizer having a molecular weight of not less than 2000, the chips of the polyester elastomer composition of the present invention were obtained.

Polyester elastomer compositions obtained in Examples and Comparative Example were evaluated for the above-mentioned evaluation items, the results of which are shown in Table 3.

Example 10

In the same manner as in Example 1 except that the polyester block copolymer obtained in Production Example 2 was used, the chips of the polyester elastomer composition of the present invention were obtained.

TABLE 3

| Components and evaluation items | Ex. 7 | Ex. 8 | Ex. 9 | Ex. 10 |
|---|---|---|---|---|
| polyester block copolymer | 100 | 100 | 100 | 100 |
| Stabilizer A | — | — | — | — |
| Stabilizer C | 1.0 | 1.5 | 1.0 | 1.0 |
| hindered phenol stabilizer | — | — | 0.3 | — |
| bisphenol F-diglycidyl ether | 4.0 | 4.0 | 4.0 | 4.0 |
| polyethyleneglycol diglycidyl ether | — | — | — | — |
| tensile strength at break (kg/cm$^2$) | 395 | 390 | 380 | 320 |
| tensile elongation at break (%) | 610 | 620 | 630 | 580 |
| MFR (g/10 min) | 14 | 15 | 15 | 1 |
| heat resistance (elongation half-life period, days) | 20 | 21 | 23 | 20 |
| resistance to hydrolysis (elongation half-life period, days) | 7 | 7 | 8 | 10 |
| gloss | 88 | 89 | 85 | 88 |
| heating loss percentage (%) | 0.12 | 0.13 | 0.15 | 0.15 |

Stabilizer C: dimethyl succinate -1-(2-hydroxyethyl)-4-hydroxy-2,2,6,6-tetramethylpiperidine condensation polymerization product (Mw: 3800)

As is evident from Tables 1 to 3, a polyester elastomer composition comprising a polyester block copolymer and a compound having, in one molecule, not less than two functional groups capable of reacting with a terminal group of the polyester shows less volatility during heating and less gel and bleed out. In addition, the composition of the present invention is dramatically superior in heat resistance and water resistance.

By the use of the polyester elastomer composition of the present invention, an elastomer molded product can be obtained, which is superior in mechanical strength, heat resistance, resistance to hydrolysis and which is associated with less volatility during heating and less gel and bleed out.

This application is based on a patent application Nos. 255156/1998, 255157/1998 and 199278/1999 fled in Japan, the content of which is hereby incorporated by reference.

What is claimed is:

1. A polyester elastomer composition comprising a polyester block copolymer and a compound having, in one molecule, not less than two functional groups capable of reacting with a terminal group of the polyester block copolymer, and showing (A) a weight loss (volatility) at 150° C., 2 hours of not more than 0.4% and (B) gelation degree (gel fraction) at 250° C., 4 hours of not more than 50%.

2. A polyester elastomer composition comprising a polyester block copolymer, a compound having, in one molecule, not less than two functional groups capable of reacting with a terminal group of the polyester block copolymer and a chain extender heating loss percentage satisfying the following formula (I), and a stabilizer comprising a tertiary amine as a part of its skeleton $$(W1-W2)/W1 \leq 0.1 \tag{I}$$

wherein W1 is the weight of the compound before heat treatment and W2 is the weight of the compound after heat treatment at 200° C. for 30 minutes.

3. The polyester elastomer composition of claim 2, wherein the compound having not less than two functional groups and satisfying the formula (I) is contained in a proportion of 0.1–10 parts by weight per 100 parts by weight of the polyester block copolymer and the stabilizer is contained in a proportion of 0.1–5 parts by weight per 100 parts by weight of the polyester block copolymer.

4. The polyester elastomer composition of claim 2, wherein the stabilizer is a compound having a molecular weight of not less than 2000.

5. The polyester elastomer composition of claim 2, wherein the tertiary amine which is a part of the stabilizer is hindered amine.

6. The polyester elastomer composition of claim 1, wherein the polyester block copolymer is obtained by reacting a crystalline aromatic polyester and a lactone.

7. The polyester elastomer composition of claim 2, wherein the polyester block copolymer is obtained by reacting a crystalline aromatic polyester and a lactone.

8. The polyester elastomer composition of claim 1, wherein the compound having not less than two functional groups is at least one member selected from the group consisting of bisphenol F-diglycidyl ether, bisphenol A-diglycidyl ether and bisphenol S-diglycidyl ether.

9. The polyester elastomer composition of claim 2, wherein the compound having not less than two functional groups and satisfying the formula (I) is at least one member selected from the group consisting of bisphenol F-diglycidyl ether, bisphenol A-diglycidyl ether and bisphenol S-diglycidyl ether.

* * * * *

UNITED STATES PATENT AND TRADEMARK OFFICE
CERTIFICATE OF CORRECTION

PATENT NO. : 6,037,423
DATED : March 14, 2000
INVENTOR(S) : Hirota Nagano et al

It is certified that error appears in the above-indentified patent and that said Letters Patent is hereby corrected as shown below:

On the title page, line [56], please insert:

--FOREIGN PATENT DOCUMENTS 10-030053   2/1998   Japan--.

Signed and Sealed this

Third Day of April, 2001

Attest:

NICHOLAS P. GODICI

Attesting Officer

Acting Director of the United States Patent and Trademark Office